United States Patent [19]

Fox et al.

[11] Patent Number: 4,709,418
[45] Date of Patent: Nov. 24, 1987

[54] WIDEBAND CABLE NETWORK

[75] Inventors: John R. Fox; Edwin J. Powter; William K. Ritchie, all of Suffolk, England

[73] Assignee: British Telecommunications public limited company, England

[21] Appl. No.: 532,100

[22] Filed: Sep. 14, 1983

[51] Int. Cl.[4] .................................. H04B 9/00
[52] U.S. Cl. ................................ 455/612; 350/96.16
[58] Field of Search .............. 455/612, 610, 3, 5; 350/96.15, 96.16, 96.23

[56] References Cited

U.S. PATENT DOCUMENTS

| | | | |
|---|---|---|---|
| 4,090,220 | 5/1978 | Gargini | 358/86 |
| 4,135,202 | 1/1979 | Cutler | 455/612 |
| 4,290,142 | 9/1981 | Schnee et al. | 455/3 |
| 4,441,180 | 4/1984 | Schussler | 370/3 |

FOREIGN PATENT DOCUMENTS

| | | |
|---|---|---|
| 2828624 | 3/1980 | Fed. Rep. of Germany . |
| 3104404 | 8/1982 | Fed. Rep. of Germany ...... 455/612 |

OTHER PUBLICATIONS

Coyne—"Integrated Broadband Dist. Syst."—Conf. Intern. Symposium on Subscriber Loops and Services-Atlanta, Ga.—20-24, Mar. 1978, pp. 44–48.
"Multi-Service Cable-Television Distribution Systems", by W. K. Ritchie, pp. 205-210—British Telec. Engineering, vol. 1, Jan. 1983.
"The Fibrevision Trail at Milton Keynes Implications for Fibre Optics in the Local Network", by John Fox, pp. 1-4, FOC, Sep. 1982.
"Fibre Optics in a Multi-Star Wideband Locak Network", by W. R. Fox, British Telecom Research Labs, 7-p 374-16, FOC, Apr. 1983.
"An Integrated Services Cable TV Network", by W. K. Ritchie, British Telecom, Ipswich, England, pp. 1-11, IBC, May 1983.
"Milton Keynes and Beyond, The Next Generation Systems", by E. John Powter, British Telecom Research Lab., pp. 185-190, NCTA, Jun. 1983.
"The Rewiring of Britain—What Does It Mean?", by W. K. Ritchie, Electronics & Power, Jun. 1983, pp. 467-470.
"Expanding Communications Services to the Local Subscriber", Claire et al., International Conference on Communications, Jun. 1981, pp. 24.51-24.5.8.
"Visual Services Trail—The British Telecom System for Teleconferencing—A New Visual Services", by Thompson, British Telecommunications Engineering, vol. 1, Apr. 1982, pp. 28-34.
"Design of a Switched Broad-Band Communications Network for Interactive Services", by Rose & Stevens, IEEE Transactions on Communications, vol. COM-23, No. 1, Jan. 1975, pp. 49-55.

Primary Examiner—Joseph A. Orsino, Jr.
Attorney, Agent, or Firm—Nixon & Vanderhye

[57] ABSTRACT

In an interactive wideband cable network in which several wideband services, such as television or video signals, can be provided simultaneously from a central service position to a remote wideband switch to which several customers are connected, the central service position is connected to the wideband switch by one or more passively tapped optical fibres through which fixed-time services are provided and the central service position is connected to the wideband switch through one or more dedicated optical fibres through which a customer can request and receive "on demand" wideband services.

36 Claims, 5 Drawing Figures

WIDEBAND CABLE NETWORK

This invention relates to a cable network which can provide wideband services, eg a plurality of television and/or video channels, and which is interactive, ie information and data can pass in both directions.

The majority of cable television services are based on "tree-and-branch" topology, that is, channels are arranged in a frequency division multiplex and are broadcast to subscribers by a broadband coaxial cable; in this context "broadband" means a bandwidth of at least 450 MHz. Each subscriber taps the frequency division multiplex signal from the cable and selects a programme by a set-top tuner. At each cable tap a signal loss occurs, and the cable is also lossy; and the summed loss is made up by the provision of amplifiers in the cable. All customers can receive any part of the signal on the cable, and with this simple arrangement the provision of a special service at a differential charging rate is impossible.

To give selected customers a special service a scrambled signal is often provided; the customer's receiving set contains a descrambler, but scrambling techniques are known, descramblers are easily available, and the security of the service is low. In the latest techniques, addressable descramblers are used;

Further problems with tree-and-branch topology occur when an interactive service is required;

1. to allow the customer to communicate with the service supplier at the central service point, the signal in the reverse direction along the coaxial cable must bypass all of the amplifiers;

2. each return path is a noise source, and this noise can limit the number of customers who can be provided with an interactive facility;

3. to cater for a large number of customers and because there is only limited return path capacity a polling system is often used in the narrow band interactive signal, so that the response time is long.

In a different system, an individual connection is made by optical fibre between a major switching point and each customer, ie a switched-star topology is used; such a system was described at FOCUS 82 in Los Angeles, September 1982 by John Fox (one of the present inventors) in a paper entitled "The Fibrevision Trial at Milton Keynes"; the major switching point is located at a distance from the customers in a separate building, and from that building a separate optical fibre link is provided to each customer; optical fibre links are at present extremely expensive, thus the system is feasible only over very short distances.

It is an object of the present invention to provide a cable network which allows a range of interactive services which is much wider than has previously been possible. The network is wideband, ie it is capable of supplying moving images, such as television or video images on a raster screen.

According to the invention, an interactive wideband cable network comprises a central service position which can supply a plurality of simultaneous wideband services;

connected to the central service position at least one optical fibre having at least one passive optical tapping point;

connected to the tapped optical fibre at least two wideband switches;

and between the central service position and each wideband switch at least one additional optical fibre associated only with that switch.

Usually each wideband switch is connected to a plurality of wideband service receiving units through individual wideband connections, each having a both-way transmission capability. The invention will now be described by way of example only with reference to the accompanying drawings in which FIG. 1 illustrates the topology of one form of cable network acording to the invention;

Figure 1:
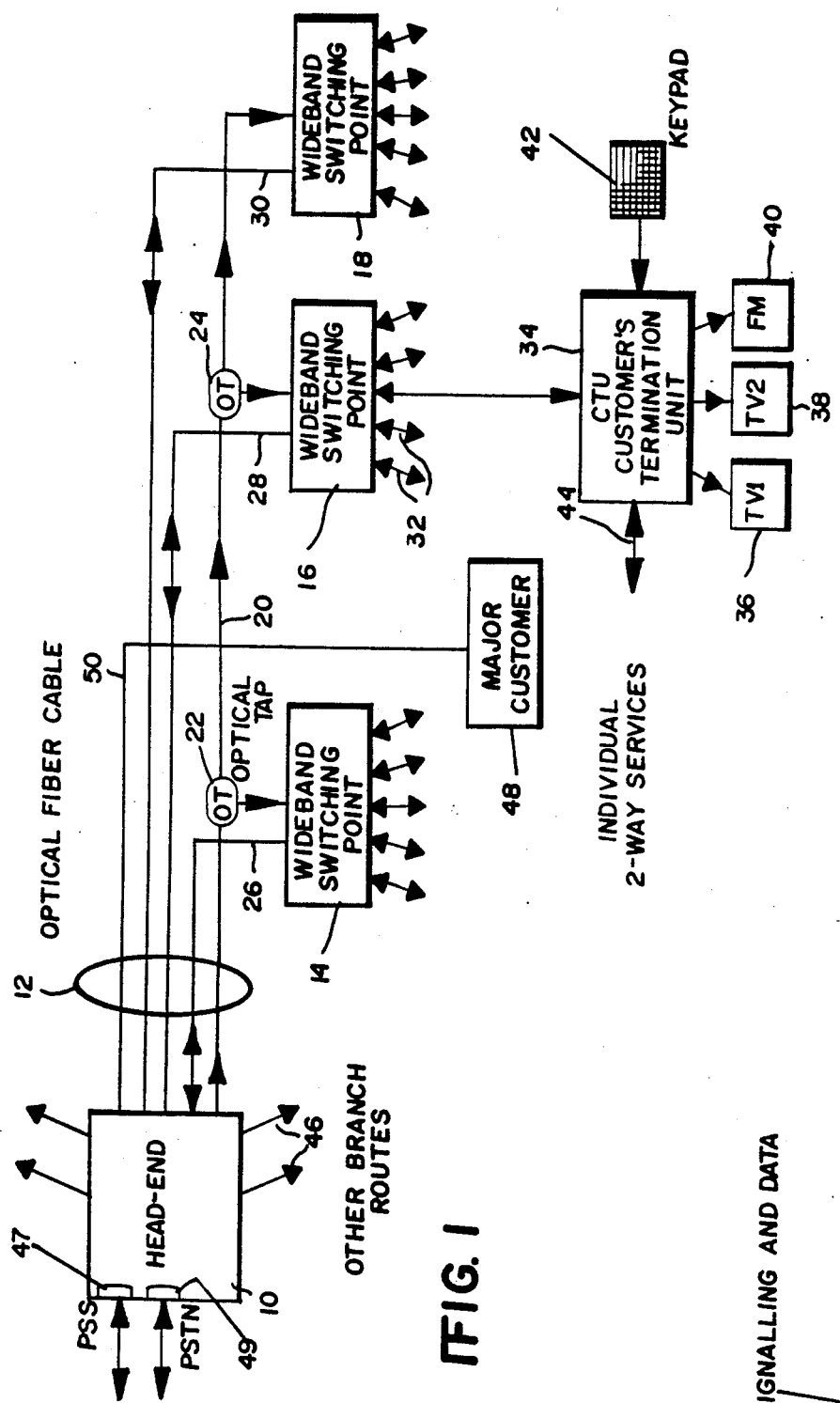

FIG. 1 shows a central service point or head-end 10 from which wideband services are supplied and which can receive and respond to requests from customers. The head-end 10 is connected by an optical fibre cable 12 to three wideband switching points (WSP) 14, 16, 18. There are two separate connections through the cable 12 to each WSP; a single services-supply optical fibre 20 is tapped by optical taps 22, 24 to give a connection to each WSP in tree-and-branch topology; the second connection is formed by a dedicated optical fibre pair from each WSP to the head-end, for example WSP 14 is connected to head-end 10 by dedicated optical fibre pair 26; WSP 16 is connected by fibre pair 28, and WSP 18 is connected by fibre pair 30; the optical fibre pairs 26, 28, 30 are arranged in star topology between the head-end 10 and the respective WSP 14, 16, 18.

Each WSP 14, 16, 18 is connected by wideband connections to several customers; the connections may be optical fibre pair or by coaxial cable. For WSP 16 the connections are indicated by the double-headed arrows 32, and five customers only are shown, although in practice there will be a greater number; each connection is two-way. One such connection is illustrated in detail; the WSP 16 is connected to a customer's termination unit 34 by coaxial cable; the services provided are shown schematically as two television receiving sets 36, 38 and a frequency-modulated radio receiving set 40; the termination unit 34 is also connected to a keypad 42 by which the customer communicates with head-end 10, and additional two-way services are indicated by the double-headed arrow 44. The services will be described in detail below.

The customer's termination unit receives VHF signals and converts them to UHF signals to feed to two conventional television receiving sets; the unit is connected to the two television sets and to the radio set 40 by conventional UHF wiring.

Although only one optical fibre cable 12 from the head-end 10 is shown in FIG. 1, in practice several or many separate cables of this type will be provided, as indicated by the arrows 46. Further the head-end is connected to the public switched telephone network PSTN and packet switched service PSS of the telephone network through respective switches 47, 49. The head-end is also connected to local studios and to other signal sources.

Reference to FIG. 1 shows that the cable layout for this interactive wideband service provision is a novel, inventive combination of a tree-and-branch topology (optical fibre 20), and star topology, (optical fibre pairs 26, 28, 30). The layout may be used for either digital or analogue signals.

FIG. 1 also illustrates the connection of a major customer 48; a dedicated optical fibre pair 50 is provided in the cable allowing the major customer the full range of interactive wideband services available without passage through a WSP such as 16. This fibre pair is arranged in star topology. Such as individual connection is very secure.

Switching in the WSP is done at baseband. The switch contains a processor which controls channel selection on request from a subscriber.

Figure 2:
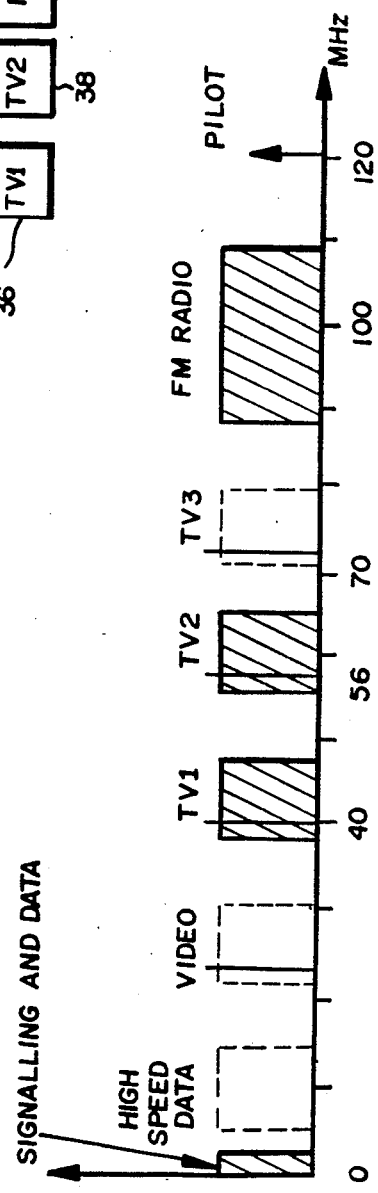
FIG. 2 illustrates the simultaneous services provided through the cable network of FIG. 1.

FIG. 2 shows an example of the spectrum allocation in the wideband link (ie the coaxial cable) between each customer termination unnit, such as 34, and a WSP such as 16. Working from high to low frequencies, the pilot signal is located at about 120 MHz, with FM radio between 88 and 108 MHz. The two television channels lie between 38 and 65 MHz, and another video channel band lies at 22 to 30 MHz. One or more video channels may transmit signals from a customer to the head-end 10. Data transfer and telephony cover the range 5 to 15 MHz, and the narrow signalling bandwidth occupies the lowest frequency range. Other signals, such as Direct Broadcast by Satellite, can be included if required. There is spare capacity between 60 and 88 MHz.

In the optical fibre cable 12, the signalling, data and telephony, and the return video signals are carried by the optical fibre pair dedicated to a particular WSP, while the TV channels are carried to the WSP by the tapped optical fibre 20. The FM radio signals may be carried either by tapped optical fibre 20 or by a dedicated fibre.

It is believed that this is the first time that such a wide range of simultaneous services has been available on a cable network.

While the range of simultaneous services shown in FIG. 2 is far greater than is currently available, the bandwidth demands are such that, given the present state of the technology, one tapped optical fibre, such as fibre 20, can only carry four television channels, especially when considering the possibility in the near future of enhanced transmission standards requiring a base bandwidth of 10 to 13 MHz instead of the 8 MHz required for the European PAL transmissions. High definition television with 1000 lines is also envisaged and will need a bandwidth of about 30 MHz, and looking even further ahead to digital TV an even higher bandwidth will be needed. It is therefore expected that each WSP will be provided with more than one tapped optical fibre and a typical arrangement is shown in FIG. 3.

A WSP 52 is connected to each of five optical fibres 54, 56, 58, 60, 62 by respective optical taps 55, 57, 59, 61 and 63. The WSP is also connected to five dedicated optical fibres 64, 66, 68, 70 and 72. The tapped fibres and the dedicated fibres form part of a cable 74 which also carries a multiplicity of optical fibres 76 and 78, indicated schematically, which are dedicated to other WSPs, not illustrated. The WSP 52 is connected to a plurality of customers by wideband links of which five are shown schematically, reference 80.

If each tapped optical fibre carries four television channels, then each customer has a choice of 20 channels. Of the five dedicated optical fibres to a WSP, three (64, 66, 68) will provide four television or video channels each of which are individually selectable by a customer, one fibre 70 carries FM radio, and the fifth fibre 72 carries four television channels from the WSP to the head-end; data and control signals are carried by a television channel.

Figure 3:
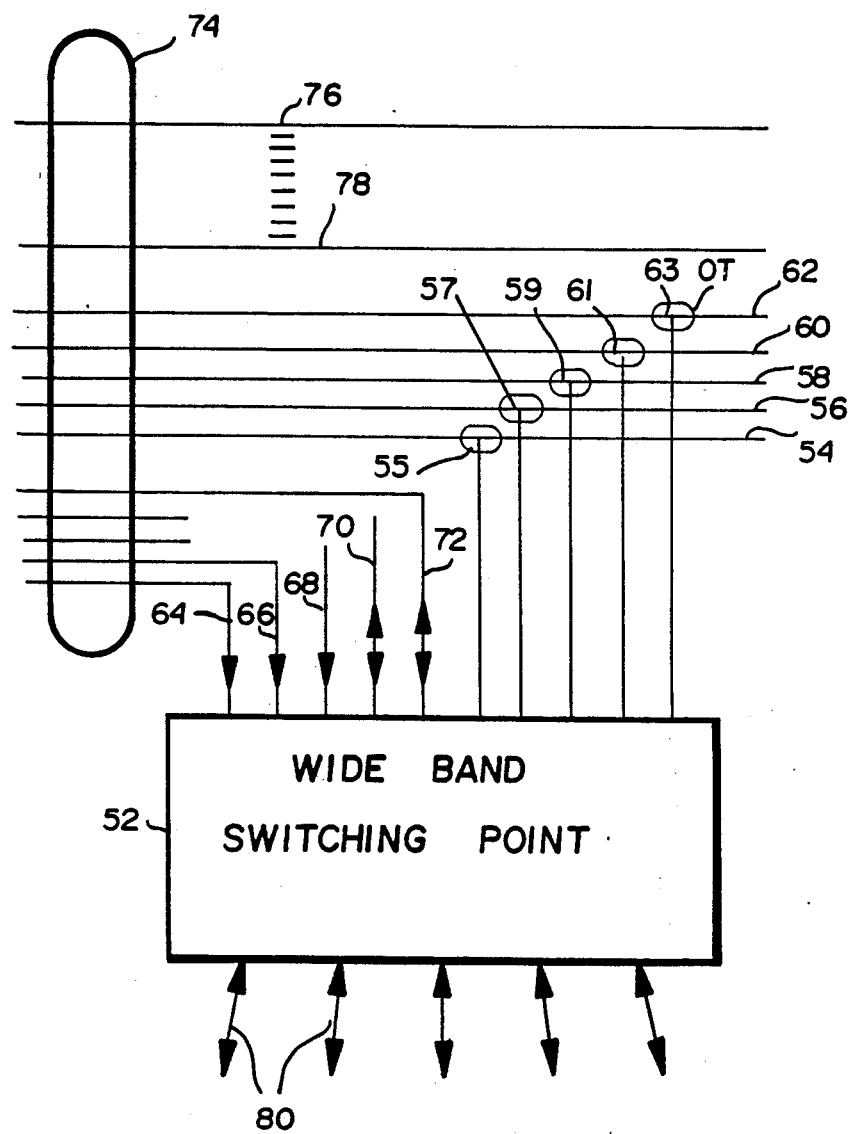
FIG. 3 illustrates schematically a modified wideband switching point.

The optical fibre connections illustrated in Figure 3 can be provided to each of the WSPs 14, 16, 18 illustrated in FIG. 1. FIG. 3 is merely one of many possible arrangements.

Figure 4:
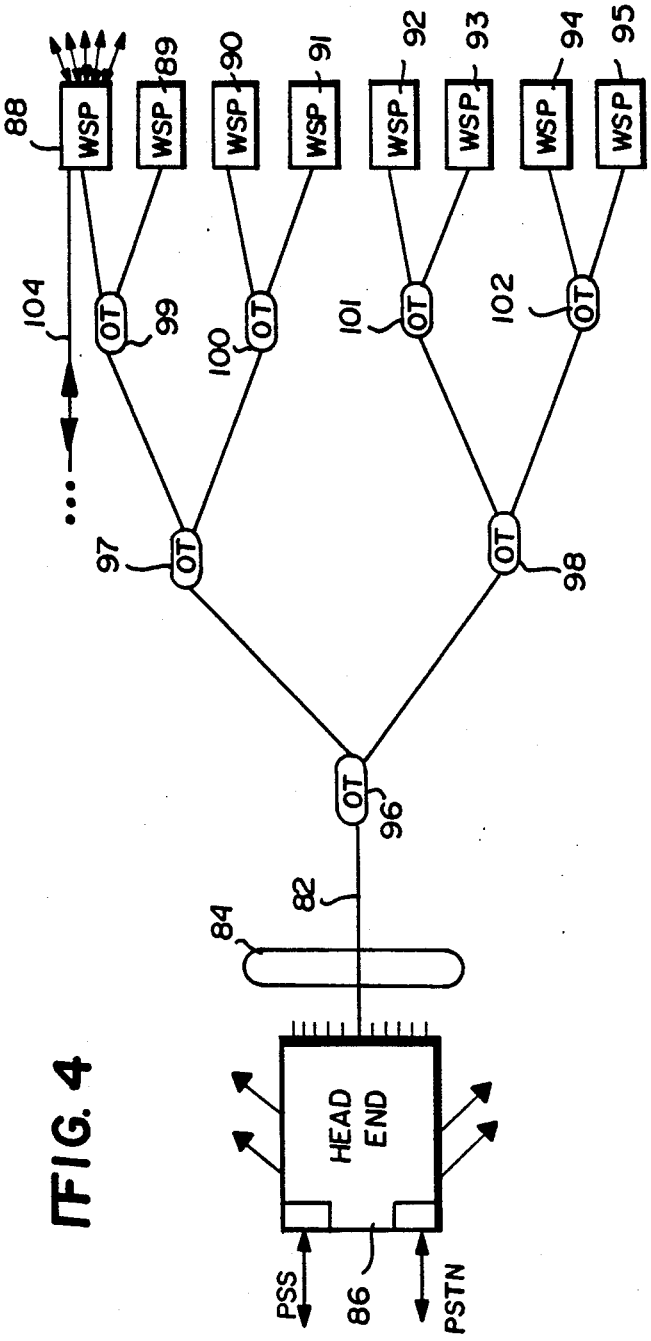
FIG. 4 illustrates a tapped optical fibre layout.

In FIG. 1 the tapped optical fibre 20 is shown with two optical taps in series, giving three WSPs, 14, 16, 18. Many other arrangements are possible; for example in FIG. 4, a single optical fibre 82 in a cable 84 from a head-end 86 is optically tapped three times in series to feed a maximum of eight WSPs, 88 to 95, by use of seven optical taps 96 to 102 each dividing the signal power by two. There is inevitably some power loss in each tap. Any of the tapped optical fibres 20 in FIG. 1 or 54 etc in FIG. 3 could be arranged in this way to feed a greater number of WSPs than illustrated in those Figures. Each WSP, such as 88, would be connected to several customers as before, and would have one or more dedicated optical fibre links such as 104.

Figure 5:
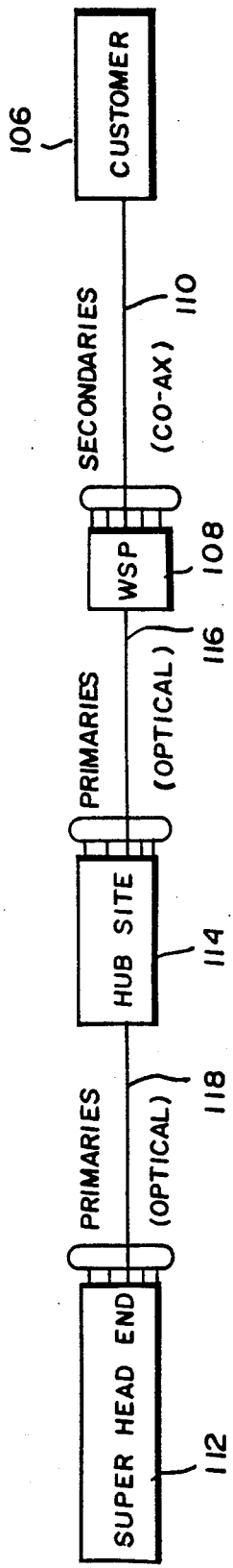
FIG. 5 illustrates a variation of the cable network topology.

The cable topology can be extended to cover a wider geographical area as shown in FIG. 5. The customer termination unit 106 and WSP 108 with their wideband connection 110 are identical to those illustrated in FIG. 1, but there is an additional node in the network; the WSP 108 is connected to the head-end 112, through a hub site 114. The topology of the cable connection 116 between the hub site 114 and the WSP 108 will be identical to that shown in FIG. 1, or to one of its variations in subsequent Figures, and the cable 118 between the hub site 114 and the super head-end 112 will be star connected.

Referring once more to FIG. 1, numerical values will now be given for some variables of the network, but these are entirely by way of example and are in no sense limiting. At the head-end 10, the four television channels will each be modulated on a carrier frequency, the carrier frequencies will be multiplexed, and the multiplexed signal is applied to modulate a narrow stripe laser source which operates at about 850 nanometres; the modulated optical signal is transmitted by the optical fibre. The graded index fibre 20 will have a loss of no more than 3.5 decibels per kilometer with a bandwidth of 600 MHz per kilometer, and the distance between the head-end 10 and each WSP such as 16 will be up to 5 kilometers. Each WSP will serve up to 300 customers at a maximum distance (ie a maximum length of coaxial cable), of 500 meters when the maximum frequency is less than 100 MHz and one head-end may serve up to 100,000 customers.

When the network variation illustrated in FIG. 5 is used, the distance from the head-end 112 to the hub site 114 may be upto 30 kilometers (using monomode fibre and a different wavelength) and the distance from the hub site 114 to the WSP 108 may be up to 5 kilometres.

Such spans of optical fibre cables can be achieved using current technology without providing repeaters.

Conveniently each WSP is located in an on-street cabinet, similar to a cabinet used for conventional telephone services, and each hub site can be co-located with a local telephone exchange.

Each of the services provided by the cable network of the present invention will be now be described

FIXED-TIME PROGRAMMES

The television programmes provided through the tapped optical fibre and FM radio will correspond to normal off-air television channels, or to a conventional cable television service which may include direct broadcast by satellite, and to conventional off-air radio. The customer has no control over the time at which signals are received, but he may, of course, record any fixed-time programme even while receiving and viewing normally a second television channel.

The provision of an interactive network allows either "free" distribution or distribution on a subscription or pay-per-view basis; in the network according to the invention, the service provided is flexible, programme security is good, and individual accounting can be comprehensive.

DATA AND TELEPHONY SERVICES

The conventional copper pair local telephony network already extends to data transmission at 64 Kbit/s, but its upper limit is likely to be reached with the Integrated Services Digital Network which is expected to extend, by the probable CCITT recommendation, to 144 kbit/s. Business customers are expected to use high bit-rate services by means of their dedicated optical fibre links, and there is access at the head-end to packet switched services (ie a service in which addressed packets of data are transferred through a public switched network) and integrated digital services. Domestic and small customers will not need such access, but low usage data services, such as required by the home computer market, can be covered by common use of a wideband service.

Other services which can be offered are alarms and telemetry which can be easily and cheaply incorporated in the signalling data streams of the network.

VIDEO SERVICES

The bandwidth allocated in FIG. 2 can be used in several ways; for example:

1. alphanumeric and photographic videotext services, in which the shared use of text generators in the WSP and picture generators in the head-end will minimise and cost of providing a high bandwidth signal to a conventional television set, in contrast to providing individual converters for use with signals received over telephone circuits. The interactive nature of the network according to the invention allows a wide range of individual interactive services such as home banking, home shopping and mailbox;

2. a video library service can be provided, by which minority-interest programmes can be provided at a time selected by a customer; an interactive mode is possible, eg fast frame search, repeat modes, frame hold, slow motion transmission, etc or response to programmed-learning transmissions.

3. A video telephone service may also be provided.

What is claimed is:

1. An interactive wideband cable network comprising:
    a central service position which can supply a plurality of simultaneous fixed-time wideband services and at least one on-demand wideband service.
    at least one passive tapped optical fibre connected to the central service position;
    at least two wideband switches connected directly to said at least one passive tapped optical fibre;
    connected to each wideband switch a plurality of wideband service receiving units, each said connection being made through individual wideband connections all of which have a both-way transmission capability; and
    connected between the central service position and each wideband switch at least one additional optical fibre associated only with that switch;
    whereby each wideband service receiving unit can receive simultaneously a plurality of wideband services from the central service position, said plurality comprising at least one fixed-time wideband service received from the central position through the at least one tapped optical fibre and at least one on-demand wideband service requested to the central service position through the at least one additional optical fibre associated only with the wideband switch to which the requesting wideband service receiving unit is connected.

2. An interactive wideband cable network according to claim 1 in which said at least one on-demand wideband service is received from the central service position through the at least one additional optical fibre associated only with the wideband switch to which the requesting wideband service receiving unit is connected.

3. An interactive network according to claim 1 or claim 2 in which there are at least two passive optical taps in each said tapped optical fibre, each such fibre being connected to at least three wideband switches.

4. An interactive network according to claim 1 or claim 2 in which there are seven passive optical taps in each said tapped optical fibre, each such fibre being connected to eight wideband switches.

5. An interactive network according to claim 1 or claim 2 in which there are at least five tapped optical fibres connected between the central service position and each of the wideband switches, and each wideband switch is additionally connected to the central service position by at least five optical fibres associated only with that switch.

6. An interactive network according to claim 5 in which of the said at least five optical fibres associated only with one wideband switch, two fibres are arranged to transfer wideband signals from the wideband switch to the central service position and three fibres are arranged to transfer wideband signals from the central service position to that wideband switch.

7. An interactive network according to claim 1 or claim 2 in which each said tapped optical fibre is connected in the central service position to signal generating means arranged to supply at least one television channel.

8. An interactive network according to claim 7 in which the signal generating means supplies to each said tapped optical fibre an optical signal which is modulated by multiplexed frequency modulated signals.

9. An interactive network according to claim 5 in which each tapped optical fibre is connected in the central service position to a respective signal generating means each arranged to supply at least one television channel.

10. An interactive network according to claim 9 in which each signal generating means supplies to its respective tapped optical fibre an optical signal which is modulated by multiplexed frequency modulated signals.

11. An interactive network according to claim 1 or claim 2 in which each additional optical fibre is connected in the central service position to signal generating means capable of supplying at least one on-demand wideband service.

12. An interactive network according to claim 11 in which the at least one on-demand wideband service includes at least one video channel.

13. An interactive network according to claim 11 in which the at least one on-demand wideband service includes at least one videotext channel.

14. An interactive network according to claim 11 in which the at least one on-demand wideband service includes at least one wideband data transmission channel.

15. An interactive network according to claim 1 or claim 2 in which the central service position is connected to a public switched telephone network.

16. An interactive network according to claim 15 in which each said additional optical fibre is connected in the central service position to means to provide a video telephone service.

17. An interactive network according to claim 1 or claim 2 in which the central service position is connected to a packet-switching service network.

18. An interactive network according to claim 17 in which each additional optical fibre is connected in the central service position to a packet-switching service switch.

19. An interactive network according to claim 1 or claim 2 in which each said individual wideband connection can carry and each said wideband service receiving unit can receive a signal having a bandwidth which encompasses simultaneously at least two television channels and frequency-modulated radio services.

20. An interactive network according to claim 19 in which said signal further encompasses at least one video signal.

21. An interactive network according to claim 1 or claim 2 in which each said wideband receiving unit includes means to provide a data signal for transmission through said at least one additional optical fibre to the central service position.

22. An interactive network according to claim 1 or claim 2 in which there is further provided at least one optical fibre connection between the central service position and a further wideband service receiving unit.

23. An interactive network according to claim 1 or claim 2 in which there are at least two additional optical fibres associated with each wideband switch arranged so that one fibre carries wideband signals from the switch to the central service position and the other fibre carries wideband signals from the central service position to the wideband switch.

24. An interactive network according to claim 23 in which one fibre carries signals originating from a plurality of wideband service receiving units connected to said wideband switch.

25. An interactive network according to claim 1 or claim 2 in which each wideband switch operates at baseband frequencies.

26. An interactive network according to claim 1 or claim 2 in which there is between the central service position and the wideband switches an additional node through which the tapped and the switch-associated optical fibres pass.

27. An interactive network according to claim 13 in which each wideband switch comprises a text generator.

28. An interactive network according to claim 1 in which each wideband switch is located in an on-street cabinet.

29. A method of providing interactive wideband services comprises transmitting a plurality of simultaneous fixed-time wideband services from a central service position to a plurality of wideband switches through at least one passively tapped optical fibre;
    receiving a request signal from any wideband switch through at least one additional optical fibre associated only with one wideband switch; and
    in response to said request signal providing at least one on demand wideband signal through an optical fibre associated with the wideband switch which originated the request.

30. A method according to claim 29 in which the request signal is transmitted from one of a plurality of customer terminating units to an associated wideband switch, and said further wideband signal is supplied to the requesting customer terminating unit.

31. A method according to claim 30 in which a further request signal is transmitted from said one customer terminating unit, and in response at least one of said plurality of wideband services is supplied to the requesting customer terminating unit.

32. An interactive wideband cable network comprising:
    a central source of wideband signals including a plurality of simultaneously broadcast fixed-time wideband services and at least one on-demand wideband service.
    a plurality of end-user or customer output ports; and
    a wideband service distribution network having two superimposed sub-networks including
        a tree and star configured first sub-network connected to convey said broadcast services from said central source to each of said output ports, a tree configured portion of said first sub-network including a passive tapped optical fiber; and
        a totally star configured second sub-network connected to include an individualized two-way communication link for conveying said on-demand signals to a particular one of said output ports in response to request signals conveyed in the opposite direction therefrom towards said central source.

33. An interactive wideband cable network as in claim 32 wherein a terminating star portion of each sub-network is merged into a common physical communication link at each output port and wherein said terminating star portion comprises:
    a plurality of wideband switches, each connected to provide each of plural groups of said output ports with wideband broadcast services taken from the tapped optical fiber tree configured portion of said first sub-network and with at least one selected on-demand service taken from the second sub-network.

34. An interactive wideband cable network as in claim 33 wherein said second sub-network includes a two-way optical fiber communication channel between the central source and one of said wideband switches and didicated solely to said one of said wideband switches.

35. An interactive optical cable distribution network for communication services comprising:
    a central source of communication services;
    a tree-configured first sub-network of passive-tapped optical fibers for distributing broadcast fixed-time one-way communication services to plural customers from a central source;

a star-configured second sub-network of optical fibers for selectively distributing on-demand communications services to selected ones of said customers from said central source and also for conveying service request signals from a given customer to said central source; and a plurality of wideband switch means, each being connected between both of said sub-networks and a predetermined group of plural customers, each said wideband switch means being connected to said first sub-network at a passive tapping point thereof and to said second sub-network via a dedicated optical fibre link connected between the switch means and said central source, each said switch means being capable of providing each customer associated therewith with said broadcast services and selectively with said on-demand services in response to customer request signals conveyed to the central source via said second sub-network.

36. An interactive wideband optical cable distribution network as in claim 35 wherein:
said second sub-network includes a dedicated two-way optical communication link between each said switch means and said central source.

* * * * *